(12) United States Patent
Ray et al.

(10) Patent No.: US 10,434,445 B2
(45) Date of Patent: *Oct. 8, 2019

(54) WOVEN GEOTEXTILE FILTRATION FABRICS INCLUDING CORE-SHEATH SPUN YARNS

(71) Applicant: Willacoochee Industrial Fabrics, Inc., Willacoochee, GA (US)

(72) Inventors: Kevin William Ray, Willacoochee, GA (US); Eric Lee Booth, Wlllacoochee, GA (US)

(73) Assignee: Willacoochee Industrial Fabrics, Inc., Willacoochee, GA (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/673,552

(22) Filed: Aug. 10, 2017

(65) Prior Publication Data

US 2017/0354907 A1    Dec. 14, 2017

Related U.S. Application Data

(63) Continuation-in-part of application No. 15/425,241, filed on Feb. 6, 2017, and a continuation-in-part of application No. 15/603,676, filed on May 24, 2017.
(Continued)

(51) Int. Cl.
  *E02B 3/12* (2006.01)
  *E02D 17/20* (2006.01)
  (Continued)

(52) U.S. Cl.
  CPC .......... *B01D 39/083* (2013.01); *D02G 3/047* (2013.01); *D02G 3/36* (2013.01); *D03D 1/00* (2013.01); *D03D 13/008* (2013.01); *D03D 15/0011* (2013.01); *D03D 15/0027* (2013.01); *D03D 15/0083* (2013.01); *D03D 15/04* (2013.01);
  (Continued)

(58) Field of Classification Search
  CPC . B01D 39/083; D10B 2505/204; E02B 3/122; E02B 3/126; E02D 17/20; E02D 17/202; E02D 2300/0087; A01G 24/44; A01G 20/20
  USPC .............. 405/16, 19, 302.6, 302.7; 442/181, 442/189–192, 195, 197, 199, 200, 209, 442/213–216
  See application file for complete search history.

(56) References Cited

U.S. PATENT DOCUMENTS

4,417,828 A    11/1983    de Winter
4,449,857 A    5/1984    Davis
(Continued)

FOREIGN PATENT DOCUMENTS

CA        2509811 A1    12/2005
WO    WO-1998/006570 A1    2/1998

OTHER PUBLICATIONS

WINFAB 400HTM Product Data Sheet; Willacoochee Industrial Fabrics, Inc., Copyright 2013; 1 page.
(Continued)

*Primary Examiner* — Benjamin F Fiorello
*Assistant Examiner* — Stacy N Lawson
(74) *Attorney, Agent, or Firm* — Harness, Dickey & Pierce, P.L.C.; Anthony G. Fussner

(57) ABSTRACT

Disclosed are exemplary embodiments of woven filtration fabrics that include core-sheath spun yarns in either or both of the warp and weft directions.

18 Claims, 7 Drawing Sheets

Related U.S. Application Data

(60) Provisional application No. 62/374,147, filed on Aug. 12, 2016, provisional application No. 62/294,096, filed on Feb. 11, 2016, provisional application No. 62/312,039, filed on Mar. 23, 2016, provisional application No. 62/341,594, filed on May 25, 2016, provisional application No. 62/355,152, filed on Jun. 27, 2016.

(51) Int. Cl.

| | |
|---|---|
| D03D 15/00 | (2006.01) |
| B01D 39/08 | (2006.01) |
| D03D 1/00 | (2006.01) |
| D02G 3/04 | (2006.01) |
| D03D 13/00 | (2006.01) |
| D03D 15/04 | (2006.01) |
| E02D 3/00 | (2006.01) |
| D02G 3/36 | (2006.01) |
| A01G 13/00 | (2006.01) |

(52) U.S. Cl.
CPC ............. *E02B 3/126* (2013.01); *E02D 3/00* (2013.01); *E02D 17/202* (2013.01); *A01G 13/00* (2013.01); *B01D 2239/0208* (2013.01); *B01D 2239/0216* (2013.01); *B01D 2239/0613* (2013.01); *B01D 2239/1216* (2013.01); *D10B 2101/06* (2013.01); *D10B 2321/021* (2013.01); *D10B 2321/022* (2013.01); *D10B 2331/02* (2013.01); *D10B 2331/04* (2013.01); *D10B 2505/204* (2013.01); *E02B 3/122* (2013.01); *E02D 17/20* (2013.01); *E02D 2300/0087* (2013.01)

(56) References Cited

U.S. PATENT DOCUMENTS

| | | | |
|---|---|---|---|
| 4,502,815 A | 3/1985 | Scales et al. | |
| 4,815,499 A | 3/1989 | Johnson | |
| 4,837,387 A | 6/1989 | van de Pol | |
| 5,091,247 A | 2/1992 | Willibey et al. | |
| 5,108,224 A | 4/1992 | Cabaniss et al. | |
| 5,237,945 A | 8/1993 | White | |
| 5,567,087 A | 10/1996 | Theisen | |
| 5,616,399 A | 4/1997 | Theisen | |
| 5,651,641 A | 7/1997 | Stephens et al. | |
| 5,735,640 A | 4/1998 | Meyer et al. | |
| 6,129,879 A * | 10/2000 | Bersted ............... | D02G 3/445 156/167 |
| 6,179,013 B1 | 1/2001 | Gulya | |
| 6,280,818 B1 * | 8/2001 | Smith .................. | B32B 5/26 428/95 |
| 6,502,360 B2 | 1/2003 | Carr, III et al. | |
| 6,506,873 B1 * | 1/2003 | Ryan ................... | D01F 6/625 264/171.11 |
| 7,112,283 B2 | 9/2006 | Stephens | |
| 7,740,420 B2 | 6/2010 | Jones et al. | |
| 7,874,767 B2 | 1/2011 | Jones et al. | |
| 8,088,117 B2 | 1/2012 | Stephens et al. | |
| 8,252,705 B2 | 8/2012 | King et al. | |
| 8,333,220 B2 | 12/2012 | King | |
| 8,598,054 B2 | 12/2013 | King et al. | |
| 2001/0046825 A1 * | 11/2001 | Smith .................. | B32B 5/26 442/270 |
| 2007/0178790 A1 * | 8/2007 | Gardner ............... | D03D 15/00 442/190 |
| 2008/0096017 A1 * | 4/2008 | Patrick ................ | D04H 3/005 428/379 |
| 2008/0182471 A1 * | 7/2008 | Danzey ................ | B66C 1/18 442/199 |
| 2008/0207073 A1 | 8/2008 | Jones | |
| 2009/0208288 A1 | 8/2009 | Stephens et al. | |
| 2011/0206458 A1 | 8/2011 | Jones et al. | |
| 2011/0250448 A1 | 10/2011 | Jones et al. | |
| 2012/0052759 A1 | 3/2012 | Wang | |
| 2012/0315816 A1 | 12/2012 | Fowler et al. | |
| 2013/0044623 A1 | 2/2013 | Speight et al. | |
| 2013/0199755 A1 * | 8/2013 | Sawafta ............... | E01C 13/08 165/104.11 |
| 2013/0244521 A1 | 9/2013 | Jones et al. | |
| 2013/0310428 A1 | 11/2013 | Joseph et al. | |
| 2014/0099850 A1 | 4/2014 | King et al. | |
| 2014/0241817 A1 | 8/2014 | Jones et al. | |
| 2015/0159305 A1 * | 6/2015 | Booth ................. | D03D 15/0088 442/189 |
| 2017/0233970 A1 | 8/2017 | Booth et al. | |

OTHER PUBLICATIONS

WINFAB 600HTM Product Data Sheet; Willacoochee Industrial Fabrics, Inc., Copyright 2013; 1 page.
WINFAB 650HTM Product Data Sheet; Willacoochee Industrial Fabrics, Inc., Copyright 2013; 1 page.
WINFAB 450HTM Product Data Sheet; Willacoochee Industrial Fabrics, Inc.; Copyright 2013; 1 page.
WINFAB 300HTM Product Data Sheet; Willacoochee Industrial Fabrics, Inc.; Copyright 2013; 1 page.
ASTM D6525/D6525M-16, Standard Test Method for Measuring Nominal Thickness of Rolled Erosion Control Products, http://www.astm.org/Standards/D6525.htm, Copyright 1996, 2 pages.
ASTM D6818-17, Standard Test Method for Ultimate Tensile Properties of Rolled Erosion Control Products, http://www.astm.org/Standards/D6818.htm, Copyright 1996, 2 pages.
ASTM D7101-13, Standard Index Test Method for Determination of Unvegetated Rolled Erosion Control Product (RECP) Ability to Protect Soil from Rain Splash and Associated Runoff Under Bench-Scale Conditions, http://www.astm.org/Standards/D7101.htm, Copyright 1996, 2 pages.
ASTM D7322/D7322M-16e1, Standard Test Method for Determination of Rolled Erosion Control Product (RECP) Ability to Encourage Seed Terination and Plant Growth Under Bench-Scale Conditions, http://www.astm.org/Standards/D7322.htm, Copyright 1996, 2 pages.
ASTM D7207-05, Standard Test Method for Determination of Unvegetated Rolled Erosion Control Product (RECP) Ability to Protect Sand from Hydraulically-Induced Shear Stresses under Bench-Scale Conditions (Withdrawn 2014), http://www.astm.org/DATABASE.CART/WITHDRAWN/d7207.htm, Copyright 1996, 2 pages.
WINFAB Industrial Fabrics Installation Guidelines; 2014, 3 pages.
Canadian Office Action for Canadian application No. 2,957,754 which names the same inventor and assignee but is not related through a priority claim; dated Mar. 21, 2018, 5 pages.
Non-final Office action for U.S. Appl. No. 15/425,241, filed Feb. 6, 2017 which names the same inventors but is not related through a priority claim, dated Jul. 27, 2018, 23 pages.

* cited by examiner

Table I

| | ASTM Method | Test Unit | Exemplary Fabric A | Reported Minimum Average Roll Values | | | |
|---|---|---|---|---|---|---|---|
| | | | | Fabric B | Fabric C | Fabric D | |
| Grab Tensile Strength - Warp | ASTM D4632 | lbs | 472 | 370 | 370 | 370 | |
| Grab Tensile Elongation - Warp | ASTM D4632 | % | 30 | 15 | 15 | 15 | |
| Grab Tensile Strength - Weft | ASTM D4632 | lbs | 362 | 250 | 250 | 250 | |
| Grab Tensile Elongation - Weft | ASTM D4632 | % | 15 | 15 | 15 | 15 | |
| CBR Puncture Strength | ASTM D6241 | lbs | 1382 | 950 | 950 | 950 | |
| Trapezoid Tear Strength - Warp | ASTM D4533 | lbs | 145 | 100 | 100 | 100 | |
| Trapezoid Tear Strength - Weft | ASTM D4533 | lbs | 256 | 60 | 60 | 60 | |
| Apparent Opening Size (AOS) | ASTM D4751 | U.S. Sieve | 200 | 70 | 70 | 70 | |
| Apparent Opening Size (AOS) | ASTM D4751 | mm | 0.075 | 0.212 | 0.212 | 0.212 | |
| Permittivity | ASTM D4491 | $sec^{-1}$ | 0.43 | 0.28 | 0.28 | 0.28 | |
| Flow Rate | ASTM D4491 | gal/min/ft$^2$ | 32 | 18 | 18 | 18 | |

FIG. 4

Table II

| | ASTM Method | Test Unit | Exemplary Fabric A | Reported Minimum Average Roll Values | | | |
|---|---|---|---|---|---|---|---|
| | | | | Fabric H | Fabric I | Fabric J | |
| Grab Tensile Strength - Warp | ASTM D4632 | lbs | 472 | 250 | 250 | 250 |
| Grab Tensile Elongation - Warp | ASTM D4632 | % | 30 | 50 | 50 | 50 |
| Grab Tensile Strength - Weft | ASTM D4632 | lbs | 362 | 250 | 250 | 250 |
| Grab Tensile Elongation - Weft | ASTM D4632 | % | 15 | 50 | 50 | 50 |
| CBR Puncture Strength | ASTM D6241 | lbs | 1382 | 625 | 700 | 700 |
| Trapezoid Tear Strength - Warp | ASTM D4533 | lbs | 145 | 100 | 100 | 100 |
| Trapezoid Tear Strength - Weft | ASTM D4533 | lbs | 256 | 100 | 100 | 100 |
| Apparent Opening Size (AOS) | ASTM D4751 | U.S. Sieve | 200 | 100 | 100 | 100 |
| Apparent Opening Size (AOS) | ASTM D4751 | mm | 0.075 | 0.150 | 0.150 | 0.150 |
| Permittivity | ASTM D4491 | sec$^{-1}$ | 0.43 | 1.2 | 0.8 | 1.2 |
| Flow Rate | ASTM D4491 | gal/min/ft$^2$ | 32 | 80 | 75 | 80 |

FIG. 5

Table III

| | ASTM Method | Test Unit | Exemplary Fabric E | Reported Minimum Average Roll Values | |
|---|---|---|---|---|---|
| | | | | Fabric F | Fabric G |
| Grab Tensile Strength - Warp | ASTM D4632 | lbs | 415 | 320 | 375 |
| Grab Tensile Elongation - Warp | ASTM D4632 | % | 28 | 15 | 15 |
| Grab Tensile Strength - Weft | ASTM D4632 | lbs | 342 | 320 | 375 |
| Grab Tensile Elongation - Weft | ASTM D4632 | % | 22 | 12 | 8 |
| CBR Puncture Strength | ASTM D6241 | lbs | 1140 | 620 | 1200 |
| Trapezoid Tear Strength - Warp | ASTM D4533 | lbs | 146 | 120 | 120 |
| Trapezoid Tear Strength - Weft | ASTM D4533 | lbs | 140 | 120 | 120 |
| Apparent Opening Size (AOS) | ASTM D4751 | U.S. Sieve | 50 | 50 | 50 |
| Apparent Opening Size (AOS) | ASTM D4751 | mm | 0.300 | 0.300 | 0.300 |
| Permittivity | ASTM D4491 | sec$^{-1}$ | 0.93 | 0.2 | 0.2 |
| Flow Rate | ASTM D4491 | gal/min/ft$^2$ | 70 | N/A | 15 |

FIG. 6

Table IV

| | ASTM Method | Test Unit | Exemplary Fabric E | Reported Minimum Average Roll Values | | | |
|---|---|---|---|---|---|---|---|
| | | | | Fabric K | Fabric L | Fabric M | |
| Grab Tensile Strength - Warp | ASTM D4632 | lbs | 415 | 80 | 80 | 80 |
| Grab Tensile Elongation - Warp | ASTM D4632 | % | 28 | 50 | 50 | 50 |
| Grab Tensile Strength - Weft | ASTM D4632 | lbs | 342 | 80 | 80 | 80 |
| Grab Tensile Elongation - Weft | ASTM D4632 | % | 22 | 50 | 50 | 50 |
| CBR Puncture Strength | ASTM D6241 | lbs | 1140 | 175 | 175 | 175 |
| Trapezoid Tear Strength - Warp | ASTM D4533 | lbs | 146 | 25 | 30 | 30 |
| Trapezoid Tear Strength - Weft | ASTM D4533 | lbs | 140 | 25 | 30 | 30 |
| Apparent Opening Size (AOS) | ASTM D4751 | U.S. Sieve | 50 | 50 | 50 | 50 |
| Apparent Opening Size (AOS) | ASTM D4751 | mm | 0.300 | 0.300 | 0.300 | 0.300 |
| Permittivity | ASTM D4491 | $sec^{-1}$ | 0.93 | 2.2 | 2.1 | 2.2 |
| Flow Rate | ASTM D4491 | gal/min/$ft^2$ | 70 | 150 | 155 | 150 |

FIG. 7

WOVEN GEOTEXTILE FILTRATION FABRICS INCLUDING CORE-SHEATH SPUN YARNS

CROSS-REFERENCE TO RELATED APPLICATIONS

This application claims the benefit of and priority to U.S. Provisional Patent Application No. 62/374,147 filed Aug. 12, 2016.

This application is a continuation-in-part of U.S. Non-Provisional patent application Ser. No. 15/425,241 filed Feb. 6, 2017 which, in turn, claimed the benefit of and priority to U.S. Provisional Application No. 62/294,096 filed Feb. 11, 2016, U.S. Provisional Application No. 62/312,039 filed Mar. 23, 2016, and U.S. Provisional Application No. 62/341,594 filed May 25, 2016.

This application is a continuation-in-part of U.S. Non-Provisional patent application Ser. No. 15/603,676 filed May 24, 2017 which, in turn, claimed the benefit of and priority to U.S. Provisional Application No. 62/355,152 filed Jun. 27, 2016 and U.S. Provisional Application No. 62/341,594 filed May 25, 2016.

The entire disclosure of each of the above applications is incorporated herein by reference.

FIELD

The present disclosure relates to woven geotextile filtration fabrics that include core-sheath spun yarns in either or both of the warp and weft directions.

BACKGROUND

This section provides background information related to the present disclosure which is not necessarily prior art.

Woven fabrics are used in the geotextile market for filtration in a number of applications. The advantages of a woven geotextile fabric for a filtration application are that the fabric is very tough to the rigors of installation and use while providing good water flow with moderate sediment retention. But for applications requiring very good sediment retention, nonwoven fabrics are usually required.

FIG. 1 shows a portion of a conventional woven fabric 10. As shown, the woven fabric 10 includes monofilament yarns 14 in the warp direction (from left to right in FIG. 1) and monofilament yarns 18 in the weft or fill direction (from top to bottom in FIG. 1).

DRAWINGS

The drawings described herein are for illustrative purposes only of selected embodiments and not all possible implementations, and are not intended to limit the scope of the present disclosure.

FIGS. 4 through 7 include tables of test data comparing various properties of woven geotextile filtration fabrics according to exemplary embodiments disclosed herein versus conventional fabrics.

DETAILED DESCRIPTION

Figure 1:
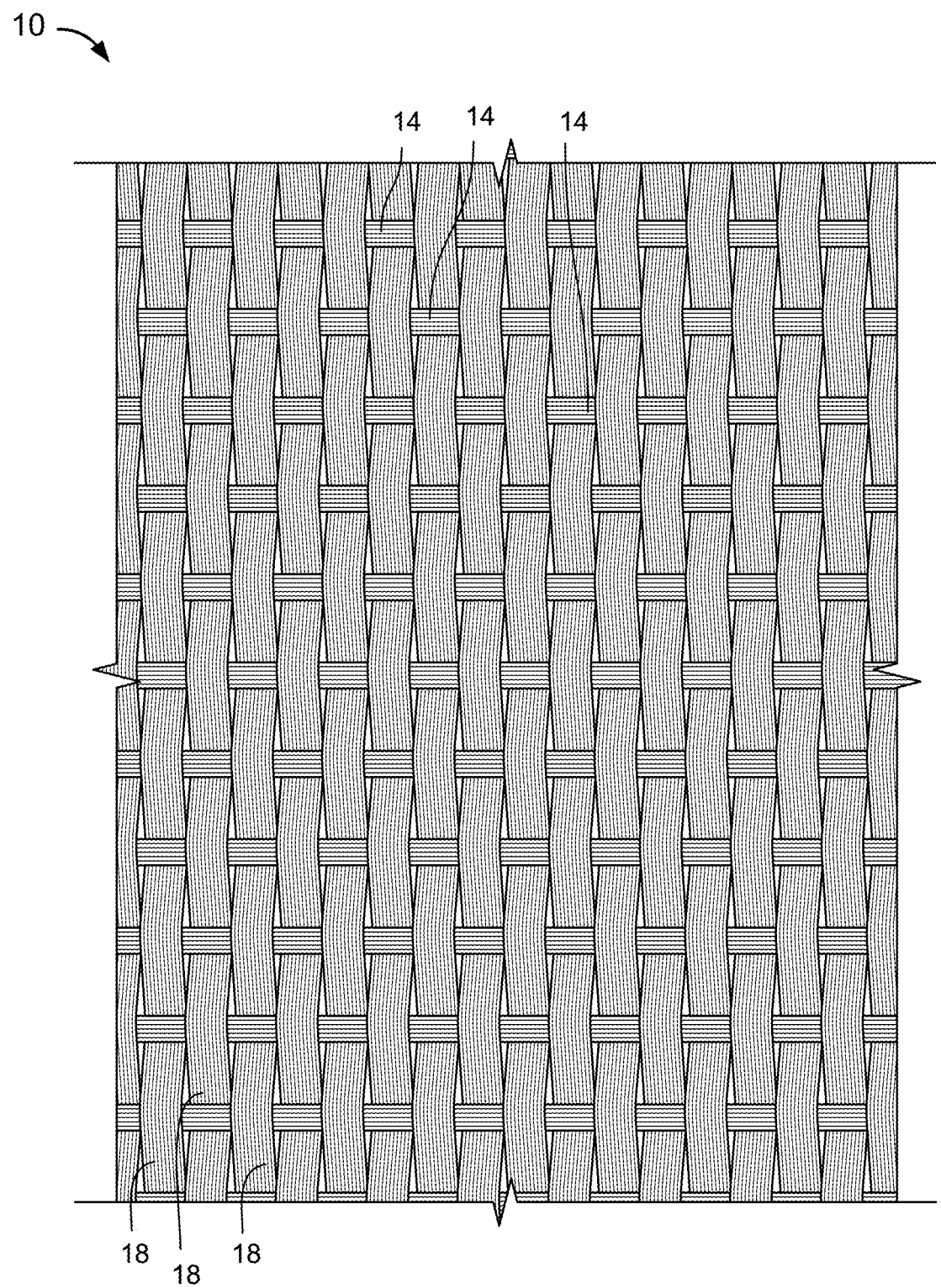
FIG. 1 shows a portion of a conventional woven fabric having monofilament yarns in the warp direction and monofilament yarns in the weft or fill direction.

Example embodiments will now be described more fully with reference to the accompanying drawings.

Disclosed herein are exemplary embodiments of woven geotextile filtration fabrics that include core-sheath spun yarns in either or both of the warp and weft directions. In exemplary embodiments in which the woven geotextile filtration fabric includes core-sheath spun yarn in only the warp direction or the weft direction, the yarn in the other one of the warp direction or weft direction may comprise a wide range of other yarns, such as other types of spun yarns (e.g., ring-spun yarn, rotor-spun yarn, open-end spun yarn, etc.), multifilament yarns (e.g., polypropylene multifilament yarn, polyethylene terephthalate (PET) multifilament yarn, etc.), and/or monofilament yarn (e.g., polypropylene monofilament yarn, etc.). The inventors hereof have recognized that using core-sheath spun yarns in either or both of the warp and weft directions allows the woven geotextile filtration fabrics to have a unique combination of filtering and strength. For example, a woven geotextile filtration fabric including core-sheath spun yarns in either or both of the warp and weft directions may be configured so as to have a really high sieve value generally seen with nonwoven filtration fabrics but while still having the strength of a woven fabric. As another example, a woven geotextile filtration fabric including core-sheath spun yarns in either or both of the warp and weft directions may be configured so as to have a relatively low sieve value and good filtration with the core-sheath spun yarn.

As shown by rows 1, 2, and 3 in the table below, exemplary embodiments of a woven geotextile filtration fabric may include core-sheath spun yarn in the warp direction and monofilament yarn, multifilament yarn, or core-sheath spun yarn in the weft direction. As shown by row 4 and 5 in the table below, exemplary embodiments of a woven geotextile filtration fabric may include core-sheath spun yarn in the weft direction and monofilament yarn or multifilament yarn in the warp direction.

| Row | Warp Yarn | Weft Yarn |
| --- | --- | --- |
| 1 | Core-Sheath Spun Yarn | Monofilament |
| 2 | Core-Sheath Spun Yarn | Multifilament |
| 3 | Core-Sheath Spun Yarn | Core-Sheath Spun Yarn |
| 4 | Monofilament | Core-Sheath Spun Yarn |
| 5 | Multifilament | Core-Sheath Spun Yarn |

A woven geotextile filtration fabric may include core-sheath spun yarn in the warp direction but not the weft direction. In the weft direction, the woven geotextile filtration fabric may include multifilament yarn and/or monofilament yarn. In this first example, the woven geotextile filtration fabric may consist of only core-sheath spun yarn in the warp direction and only multifilament and/or monofilament yarn in the weft direction. Or, for example, a woven geotextile filtration fabric may include core-sheath spun yarn in the weft direction but not the warp direction. In the warp direction, the woven geotextile filtration fabric may include multifilament yarn and/or monofilament yarn. In this second example, the woven geotextile filtration fabric may consist of only core-sheath spun yarn in the weft direction and only multifilament and/or monofilament yarn in the warp direction. As another example, a woven geotextile filtration fabric may include core-sheath spun yarn in both the warp and weft directions. In this third example, the woven geotextile filtration fabric may consist of only core-sheath spun yarn in both the weft and warp directions. Alternatively, the example woven geotextile filtration fabrics described above may additionally include one or more other yarns in either or both of the warp and weft directions.

In the above examples, the core-sheath spun yarn may include a polypropylene core having a denier about 1800 and a polypropylene fiber sheath having a denier about 1600. The polypropylene core and polypropylene fiber sheath may each have a round (e.g., circular or substantially circular, etc.) cross section. Alternatively, other yarns may be used in other exemplary embodiments, such as yarns with higher or lower denier (e.g., core yarns of 100 denier to 11,000 denier that are single strands or bundled into strands of two or more strands, etc.), yarns with other cross-sectional shapes or geometries (e.g., noncircular, oval-shaped, etc.), yarns made out of other materials, tape yarns, fibrillated yarns, etc. Also, the warp and weft yarns may have the same denier, or they may have deniers different from each other.

Regarding the core-sheath spun yarns, the core yarns may range from a total of 100 denier to 11,000 denier each. For example, core yarns of 100 denier to 11,000 denier that are single strands or bundled into strands of two or more strands may be used in exemplary embodiments. The core yarns may be comprised of polyethylene homopolymers, polypropylene homopolymers, polyesters, nylons, fiberglass, polyphenylene oxide, natural and/or synthetic fibers, other synthetic or natural raw material(s), etc. The sheath fibers may be made from polypropylene, polyethylene, polyester, nylon, rayon, different terpolymers, acrylic, aramid fibers, natural and/or synthetic fibers, other synthetic or natural raw material(s), etc. The sheath weight percentage compared to the total weight of the core-sheath spun yarn may range from about 10% to about 99% in exemplary embodiments. Alternatively, other core-sheath spun yarns may be used in other exemplary embodiments.

The core-sheath spun yarn may include relatively short filaments or staple fibers from 1 denier per filament (dpf) to 60 dpf. The short filaments or staple fibers may be spun, entangled, twisted, etc., together to form a larger yarn. The short filaments or staple fibers may also be utilized in a core-sheath spun yarn where single or multiple yarns for a core structure are encapsulated in a single or multiple (e.g., 1 to 1 to 6, etc.) blend of fibers around the core.

By way of example only, the core-sheath spun yarns may be made by Dref spinning, ring spinning, rotor spinning, open-end spinning, etc. But aspects of the present disclosure should not be limited to any single type of manufacturing process for making the core-sheath spun yarns.

In exemplary embodiments in which the woven geotextile filtration fabric includes core-sheath spun yarn in only the warp direction or the weft direction, the yarn in the other one of the warp direction or weft direction may comprise a wide range of other yarns, such as yarns with other cross-sectional shapes or geometries (e.g., noncircular, oval-shaped, etc.), yarns made out of other materials (e.g., polypropylene, polyethylene, polyester, nylon, rayon, different terpolymers, acrylic, aramid fibers, other raw material(s), etc.), yarns with a higher or lower denier than the core-sheath spun yarn, etc.

As recognized by the inventors hereof, advantages of using core-sheath spun yarns in a woven geotextile filtration fabric are that the filament fibers and/or core structure of the yarns can be configured (e.g., engineered, designed, etc.) to achieve the strength and toughness needed in the fabric while the fiber can be configured (e.g., engineered, designed, etc.) to achieve the appearance and functional properties desired. For example, the core-sheath spun yarns (e.g., the core and/or the sheath fiber, etc.) can be enhanced or treated for UV resistance, flame retardance, water absorption, tackiness, oil attraction, and/or other desirable properties.

As disclosed herein, the woven geotextile filtration fabric may include one or more different types of yarn in addition to the core-sheath spun yarns in the warp and/or weft directions, such as multifilament yarns, monofilament yarns, and/or other spun yarns in either or both the weft and warp directions. The woven geotextile filtration fabric may be formed by layers of warp and weft yarns secured or interwoven together in a weave (e.g., a plain weave, etc.), construction, or pattern, which helps to enhance water flow and strength characteristics.

In exemplary embodiments, the warp yarns and weft yarns may have different cross-sectional shapes. In some exemplary embodiments, the weft yarns have a round, substantially circular cross-sectional shape, and the warp yarns have an oval cross-sectional shape with a width greater than its thickness or height. Alternatively, other embodiments may include warp and weft yarns that have the same cross-sectional shapes or geometries. For example, the warp and weft yarns may both have an oval or round cross-sectional shape. Alternative embodiments may include a woven geotextile filtration fabric having warp and/or weft yarns with other or additional cross-sectional shapes, geometries, and/or sizes.

In exemplary embodiments, the woven geotextile filtration fabric may consist of a single warp set/system and a single weft set/system. In this example, either or both of the first/warp system and the second/weft system may include core-sheath spun yarns. The first and second (or warp and weft) sets of yarns may be interwoven together to form a dimensionally stable network, which allows the yarns to maintain their relative position. By way of example only, the weft system may comprise core-sheath spun yarns including a polypropylene core with a denier of about 1800 and a polypropylene fiber sheath with a denier of about 1600. The core and the sheath may each have a rounded or substantially circular cross-sectional shape. The warp system may comprise a polypropylene monofilament yarn with a denier of about 1000 and a substantially oval-shaped cross-section.

Figure 2:
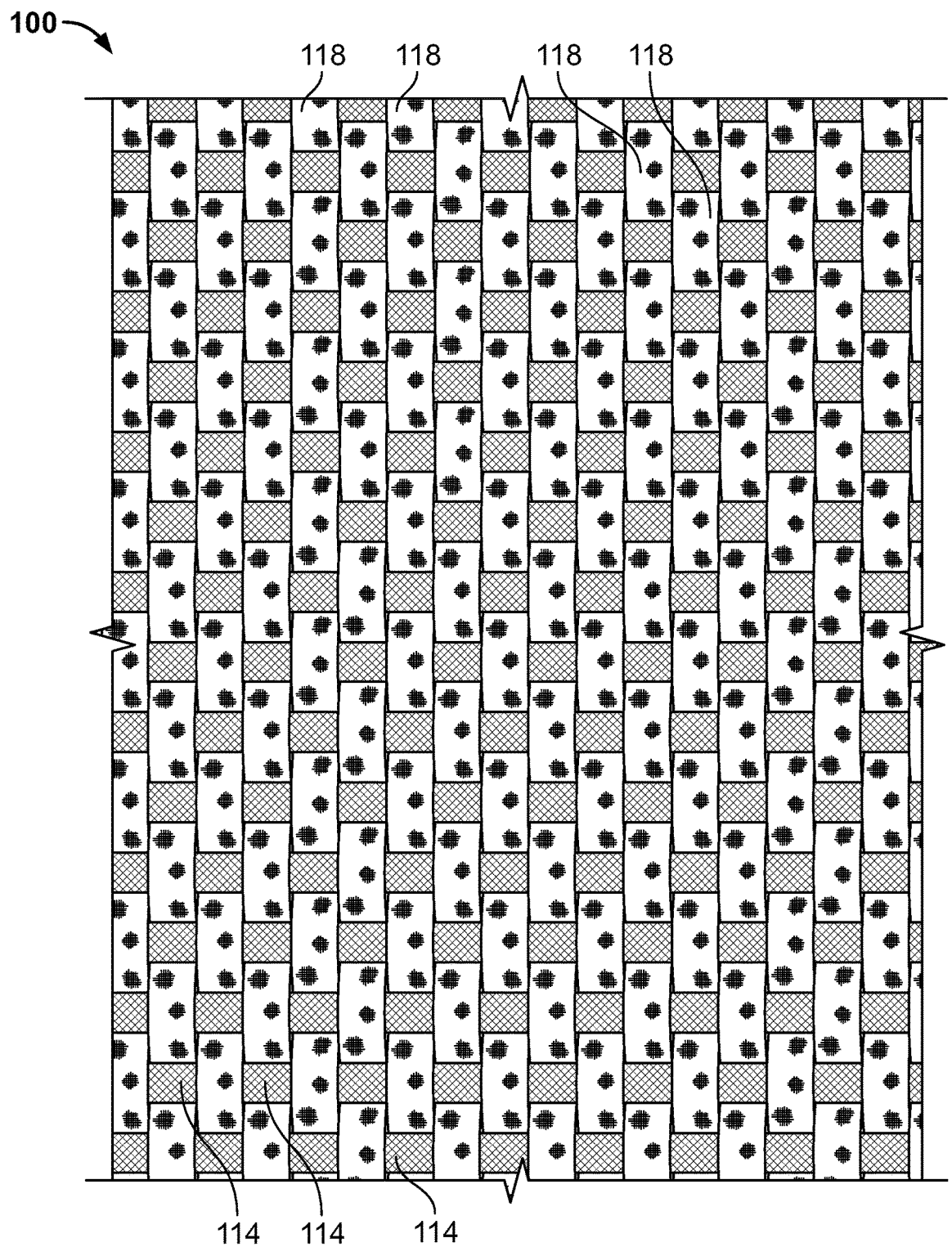
FIG. 2 shows a portion of a woven geotextile filtration fabric according to an exemplary embodiment that includes core-sheath spun yarn in the weft direction (vertical direction in FIG. 2) and polypropylene monofilament yarn in the warp direction (horizontal direction in FIG. 2)

With reference now to the figure, FIG. 2 illustrates an exemplary embodiment of a woven geotextile filtration fabric 100 embodying one or more aspects of the present disclosure. As shown, the woven geotextile filtration fabric 100 includes warp yarns 114 in the warp direction (from left to right in FIG. 2) and weft yarns 118 in the weft direction (from top to bottom in FIG. 2).

In this exemplary embodiment, the woven geotextile filtration fabric 100 includes monofilament yarns 114 in the warp direction and core-sheath spun yarns 118 in the weft direction. In alternative embodiments, the woven geotextile filtration fabric 100 may include core-sheath spun yarn in the warp direction and monofilament yarn in the weft direction. In other embodiments, the woven geotextile filtration fabric 100 may include core-sheath spun yarn in both the warp direction and the weft direction. In yet other embodiments, the woven geotextile filtration fabric 100 may include core-sheath spun yarns in either or both the warp and weft directions and one or more other types of yarn in either or both warp and weft directions in addition to the core-sheath spun yarns, such as multifilament yarns, other spun yarns, monofilament yarns, fibers, threads, other yarn types such as tape yarns and/or fibrillated yarns, etc.

Also by way of example only, the core-sheath spun yarns 118 may range from a total of 100 denier to 11,000 denier each. For example, core yarns of 100 denier to 11,000 denier that are single strands or bundled into strands of two or more strands may be used in exemplary embodiments. The core yarns may be comprised of polyethylene homopolymers, polypropylene homopolymers, polyesters, nylons, fiberglass, polyphenylene oxide, natural and/or synthetic fibers, other synthetic or natural raw material(s), etc. The sheath fibers may be made from polypropylene, polyethylene, polyester, nylon, rayon, different terpolymers, acrylic, aramid fibers, natural and/or synthetic fibers, other synthetic or natural raw material(s), etc. The sheath weight percentage compared to the total weight of the yarn may range from about 10% to about 99%. The core-sheath spun yarn may include relatively small filaments or staple fibers that are from 1 denier per filament (dpf) to 60 dpf. The short filaments or staple fibers may be spun, entangled, twisted, etc., together to form single or multiple yarns for the core structure, which are encapsulated in a single or multiple (e.g., 1 to 1 to 6, etc.) blend of fibers around the core. The core-sheath spun yarns may be made by a process known as Dref spinning. In one particular example, the core-sheath spun yarns 118 may comprise a polypropylene core having a denier about 1800 and a polypropylene fiber sheath having a denier about 1600. The polypropylene core and polypropylene fiber sheath may each have a round (e.g., circular or substantially circular, etc.) cross section. Alternatively, other core-sheath spun yarns may be used in other exemplary embodiments, such as core-sheath spun yarns with higher or lower denier, core-sheath spun yarns with other cross-sectional shapes or geometries (e.g., noncircular, oval-shaped, etc.), core-sheath spun yarns made out of other materials, core-sheath spun yarns made via other processes besides Dref spinning (e.g., rotor spinning, ring spinning, open-end spinning, etc.), etc.

Figure 3:
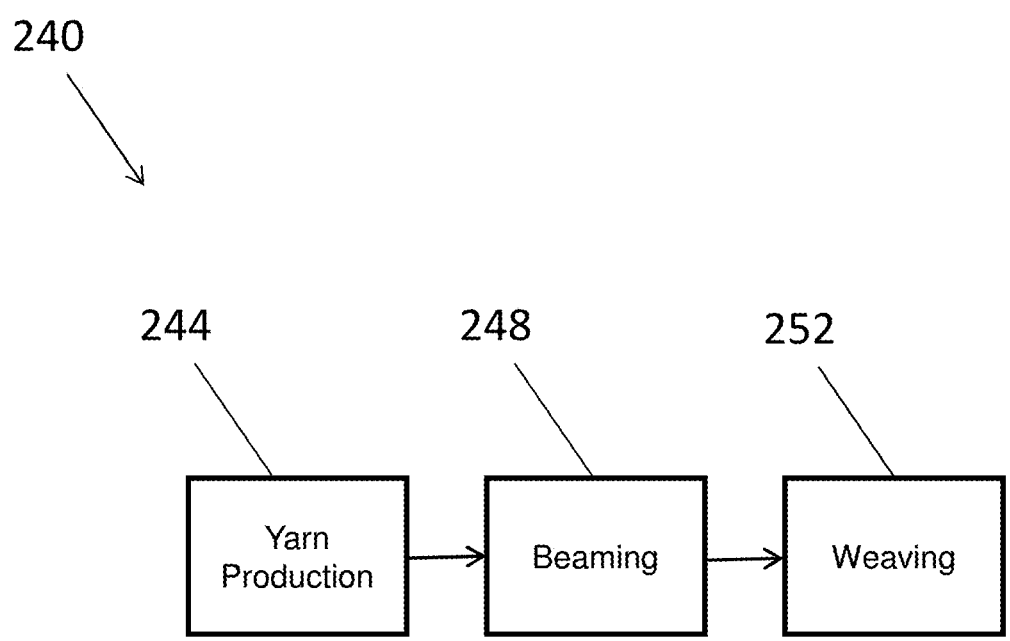
FIG. 3 is a process flow diagram representing an exemplary manufacturing process or method of making a woven geotextile filtration fabric according to an exemplary embodiment.

FIG. 3 is a process flow diagram representing an exemplary manufacturing process or method 240 of making a woven geotextile filtration fabric (e.g., woven geotextile filtration fabric 100 shown in FIG. 1, etc.) according to exemplary embodiments. Generally, the method 240 includes three operations or steps labeled as yarn production 244, beaming 248, and weaving 252 in FIG. 3.

By way of background, single strand yarns are produced from plastic resin pellets. These pellets are introduced to a plastic extrusion machine, which heats the pellets to a high enough temperature to transform the pellets into a molten state. At this point, additives (e.g., color or other substances, etc.) can be introduced along with the plastic pellets to achieve desired characteristics of the yarn. The molten plastic is then forced through a hole in a die to create a continuous strand. The shape of the hole governs the shape of the strand. The molten strand is then quenched to become solid again. The solid state strand is then stretched, e.g., from 5 times to 12 times, to achieve appropriate physical properties. After it is stretched, the yarn strand is then wound onto a tube for later use.

Filament yarns are extruded in a similar manner as described above. But the individual holes are much smaller. These individual strands are then bundled together to form a heavier weight yarn. The yarn bundle can then be exposed to a number of other processes (e.g., twisting, etc.) to enhance the yarn properties.

Spun yarns are manufactured from cut lengths of plastic fibers or relatively short staple fibers. These fibers are entangled among themselves or around a core yarn(s) to form a single strand of yarn.

After the yarns are manufactured at the first yarn product operation or step 244, the yarns may then proceed to the second operation or step 248 where the yarns are processed into either warp yarns or weft yarns for a woven geotextile filtration fabric. First, individual packages of yarn are loaded onto a creel and then transferred to a single loom beam. These yarns are generally referred to as warp yarns. A loom beam may contain thousands of individual warp yarns. The loom beam becomes the source in the loom for the machine direction yarns. Other yarns are then inserted on the loom in the cross machine direction of the woven fabric. These other yarns are generally known as weft or fill yarns.

At the third operation or step 252, a weaving machine, commonly called a loom, is loaded with the loom beam and the weft yarns mentioned above. The weaving machine then interlaces the yarns in a woven method (e.g., in a plain weave, etc.).

The method 240 shown in FIG. 3 and described above is provided for purpose of illustration only as a woven geotextile filtration fabric may be made by other processes. For example, another exemplary embodiment may include a woven geotextile filtration fabric including core-sheath spun yarn in either or both of the warp and weft directions where the woven geotextile filtration fabric is made by a different process.

To better examine advantages or benefits that may be realized with the exemplary embodiments of woven geotextile filtration fabrics disclosed, various tests were conducted for comparative purposes only. To this end, FIGS. 4 through 7 include tables I, II, III, and IV, respectively, of test data comparing various properties of woven geotextile filtration fabrics according to exemplary embodiments versus conventional fabrics.

More specifically, FIGS. 4, 5, 6, and 7 include Tables I, II, III, and IV, respectively, with test data relating to grab tensile strength (pounds) in the warp and weft directions according to ASTM D4632, grab tensile elongation (%) in the warp and weft directions according to ASTM D4632, CBR (California Bearing Ratio) Puncture Strength (pounds) according to ASTM D6241, trapezoid tear strength (pounds) in the warp and weft directions according to ASTM D4533, apparent opening size (AOS) (U.S. Sieve) according to ASTM D4751, permittivity (sec-1) according to ASTM D4491, and Flow Rate in gallons per minute per square foot (gal/min/ft2) according to ASTM D4491. The ASTM test methods listed in Tables I, II, III, and IV are commonly recognized tests used by those in the geotextile industry.

In Tables I and II, a woven geotextile filtration fabric according to an exemplary embodiment is referred to as Exemplary Fabric A. Conventional fabrics in the industry are referred to in Tables I and II as Fabrics B, C, D, H, I, and J.

For this testing, Fabric A included monofilament yarns in the warp direction and core-sheath spun yarns in the weft direction. The monofilament yarns included polypropylene monofilament yarn having a denier of about 1000 and an oval cross-sectional shape. The core-sheath spun yarns included a polypropylene core having a denier of about 1800 and a round cross section. The core-sheath spun yarns also included a polypropylene fiber sheath having a denier about 1600 and a round cross section.

As shown in Table I, Fabric A performed at 27% to 45% better when evaluated on strength when compared to the published Minimum Average Roll Values (MARV) of common woven fabrics B, C, and D in the industry with similar constructions. Notably, the opening size of the Exemplary Fabric A was significantly better with an Apparent Opening Size (AOS) of 200 (0.075 mm) versus the Apparent Opening Size (AOS) of 70 (0.212 mm) of the conventional woven fabrics B, C, and D.

The AOS test generally gauges the opening sizes of the weave, which, in turn, predicts the amount of sediment that the fabric will catch or hold when used in a geotextile application. In contrast to the AOS test, water flow is a measurement of the amount of water that will flow through the fabric. In general, as AOS is tighter/smaller, the water flow is lower due to the constricting nature of the weave construction. But in this case, the Exemplary Fabric A had a water flow rate of 32 gal/min/ft$^2$, which was higher than the 18 gal/min/ft$^2$ water flow rate of the conventional woven Fabrics B, C, and D even though the AOS of Fabric A was 200 and thus higher than the 70 AOS of conventional woven Fabrics B, C, and D.

In Table II, Fabric A is compared to MARV (Minimum Average Roll Values) data for three typical 10 ounce nonwoven fabrics identified as Fabrics H, I, and J. The AOS for these nonwoven Fabric H, I, and J is 100 (0.150 mm) compared to an AOS of 200 (0.075 mm) for Fabric A. Water flow for the nonwoven Fabrics H, I, and J is approximately 60% less. The strength characteristics of Fabric A is 44% to 121% greater than the nonwoven Fabrics H, I, and J. Elongation for Fabric A is 40% to 70% less than the published data for the nonwoven Fabrics H, I, and J, which may be advantageous as many applications may require lower elongations for which nonwoven fabrics are not well suited.

As noted above, Fabric A included polypropylene monofilament warp yarns having a denier of about 1000 and an oval cross-sectional shape. Fabric A also included core-sheath spun weft yarns. The core-sheath spun yarns included a polypropylene core having a denier of about 1800 and a round cross section. The core-sheath spun yarns also included a polypropylene fiber sheath having a denier about 1600 and a round cross section. As shown by Tables I and II, the test data for Fabric A included the following:

grab tensile strength of 472 pounds in the warp direction according to ASTM D4632;
grab tensile elongation of 30% in the warp direction according to ASTM D4632;
grab tensile strength of 362 pounds in the weft direction according to ASTM D4632;
grab tensile elongation of 9% in the weft direction according to ASTM D4632;
CBR puncture strength of 1382 pounds according to ASTM D6241;
trapezoid tear strength of 145 pounds in the warp direction according to ASTM D4533;
trapezoid tear strength of 256 pounds in the weft direction according to ASTM D4533;
apparent opening size (AOS) of 200 U.S. Sieve or 0.075 mm according to ASTM D4751;
permittivity of 0.43 sec$^{-1}$ according to ASTM D4491; and
water flow rate of 32 gal/min/ft$^2$.

In Tables III and IV, a woven geotextile filtration fabric according to an exemplary embodiment is referred to as Exemplary Fabric E. Conventional fabrics in the industry are referred to in Tables III and IV as Fabrics F, G, K, L, and M.

For this testing, Fabric E included monofilament yarns in the warp direction and core-sheath spun yarns in the weft direction. The monofilament yarns included polypropylene monofilament yarn having a denier of about 1000 and an oval cross-sectional shape. The core-sheath spun yarns had a total denier of about 1800. The core-sheath spun yarns included a polypropylene core having a denier of about 1100 and a round cross section. The core-sheath spun yarns also included a polypropylene fiber sheath having a denier about 700 and a round cross section.

As shown in Table III, the Fabric E performed at 29% to 83% better when evaluated on strength when compared to the published Minimum Average Roll Values (MARV) of common Fabrics F and G in the industry with similar constructions. And, the opening size of the fabric was similar with an Apparent Opening Size (AOS) of 50 (0.300 mm) vs. 50 (0.300 mm). In contrast, while the AOS tests were similar, water flow for the Exemplary Fabric E was 365% better than published data for similar woven fabrics.

In Table IV, the Exemplary Fabric E is compared to MARV data for typical 3.1 ounce nonwoven fabrics K, L, and M. The AOS for these nonwoven fabrics K, L, and M is 50 (0.300 mm) compared to 50 (0.300 mm) for the Exemplary Fabric E. Water flow for the nonwoven fabrics K, L, and M is approximately 114% higher than Fabric E. But the strength characteristics of the Exemplary Fabric E are 327% to 551% greater than the nonwoven fabrics K, L, and M while elongation for the Exemplary Fabric E is 44% to 56% less than the published data for the nonwoven fabrics K, L, and M.

As noted above, Fabric E included polypropylene monofilament warp yarns having a denier of about 1000 and an oval cross-sectional shape. Fabric E also included core-sheath spun weft yarns having a total denier of about 1800. The core-sheath spun yarns included a polypropylene core having a denier of about 1100 and a round cross section. The core-sheath spun yarns also included a polypropylene fiber sheath having a denier about 700 and a round cross section. As shown by Tables III and IV, the test data for Fabric E included the following:

grab tensile strength of 415 pounds in the warp direction according to ASTM D4632;
grab tensile elongation of 28% in the warp direction according to ASTM D4632;
grab tensile strength of 342 pounds in the weft direction according to ASTM D4632;
grab tensile elongation of 22% in the weft direction according to ASTM D4632;
CBR puncture strength of 1140 pounds according to ASTM D6241;
trapezoid tear strength of 146 pounds in the warp direction according to ASTM D4533;
trapezoid tear strength of 140 pounds in the weft direction according to ASTM D4533;
apparent opening size (AOS) of 50 U.S. Sieve or 0.300 mm according to ASTM D4751;
permittivity of 0.93 sec$^{-1}$ according to ASTM D4491; and
water flow rate of 70 gal/min/ft$^2$.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A woven geotextile filtration fabric comprising core-sheath spun yarn in one of a warp direction and a weft direction, and polypropylene monofilament yarn in the other one of the warp and weft directions, wherein:
    the core-sheath spun yarn comprises a polypropylene core and a polypropylene or polyester fiber sheath;
    the polypropylene monofilament yarn has an oval cross section;
    the polypropylene core has a round cross section; and
    the polypropylene or polyester fiber sheath has a round cross section.

2. The woven geotextile filtration fabric of claim 1, wherein the woven geotextile filtration fabric has:
    a grab tensile strength of about 472 pounds or more in the warp direction; and/or
    a grab tensile strength of about 362 pounds or more in the weft direction; and/or a CBR (California Bearing Ratio) puncture strength of about 1382 pounds or more; and/or a trapezoid tear strength of about 145 pounds or more in the warp direction; and/or a trapezoid tear strength of about 256 pounds or more in the weft direction.

3. The woven geotextile filtration fabric of claim 1, wherein:

the woven geotextile filtration fabric is configured to have an apparent opening size of about 0.075 millimeters or less and a water flow rate of at least 32 gallons per minute per square foot; or the woven geotextile filtration fabric is configured to have an apparent opening size of about 0.300 millimeters or less and a water flow rate of at least 70 gallons per minute per square foot.

4. The woven geotextile filtration fabric of claim 1, wherein the geotextile filtration fabric has:

a grab tensile strength of about 415 pounds or more in the warp direction; and/or a grab tensile strength of about 342 pounds or more in the weft direction; and/or a CBR (California Bearing Ratio) puncture strength of about 1140 pounds or more; and/or a trapezoid tear strength of about 146 pounds or more in the warp direction; and/or a trapezoid tear strength of about 140 pounds or more in the weft direction.

5. The woven geotextile filtration fabric of claim 1, wherein the woven geotextile filtration fabric comprises:

the core-sheath spun yarn in the weft direction comprising the polypropylene core having a denier of about 1800 and the round cross section, and the polypropylene or polyester fiber sheath having a denier of about 1600 and the round cross section; and the polypropylene monofilament yarn in the warp direction having a denier of about 1000 and the oval or cross section.

6. The woven geotextile filtration fabric of claim 1, wherein the woven geotextile filtration fabric comprises:

the core-sheath spun yarn in the weft direction having a total denier of about 1800, the core-sheath spun yarn comprising the polypropylene core having a denier of about 1100 and the round cross section, and the polypropylene or polyester fiber sheath having a denier of about 700 and the round cross section; and the polypropylene monofilament yarn in the warp direction having a denier of about 1000 and the oval cross section.

7. The woven geotextile filtration fabric of claim 1, wherein:

a sheath weight percentage compared to a total weight of the core-sheath spun yarn ranges from about 10% to about 99%; and/or the core-sheath spun yarn includes filaments having 1 denier per filament to 60 denier per filament, and the filaments are coupled together to form a single or multiple yarns for a core, which are encapsulated in a single fiber or a blend of multiple fibers around the core.

8. The woven geotextile filtration fabric of claim 1, wherein:

the polypropylene monofilament yarn has a denier of about 1000 and the oval cross section;

the polypropylene core has a denier of about 1100 or about 1800 and the round cross section; and the polypropylene or polyester fiber sheath has a denier of about 1100 or about 1600 and the round cross section.

9. The woven geotextile filtration fabric of claim 8, wherein:

the woven geotextile filtration fabric is configured to have an apparent opening size of about 0.075 millimeters or less and a water flow rate of at least 32 gallons per minute per square foot; or the woven geotextile filtration fabric is configured to have an apparent opening size of about 0.300 millimeters or less and a water flow rate of at least 70 gallons per minute per square foot.

10. The woven geotextile filtration fabric of claim 1, wherein:

the woven geotextile filtration fabric comprises the core-sheath spun yarn in the weft direction, and the polypropylene monofilament yarn in the warp direction;

the core-sheath spun yarn comprises the polypropylene core having a denier of about 1800 and the round cross section, and the polypropylene or polyester fiber sheath having a denier of about 1600 and the round cross section;

the polypropylene monofilament yarn has a denier of about 1000 and the oval cross section;

the woven geotextile filtration fabric is configured to have an apparent opening size of about 0.075 millimeters or less and a water flow rate of at least 32 gallons per minute per square foot;

a grab tensile strength of about 472 pounds or more in the warp direction;

a grab tensile strength of about 362 pounds or more in the weft direction;

a CBR (California Bearing Ratio) puncture strength of about 1382 pounds or more;

a trapezoid tear strength of about 145 pounds or more in the warp direction; and a trapezoid tear strength of about 256 pounds or more in the weft direction.

11. The woven geotextile filtration fabric of claim 1, wherein:

the woven geotextile filtration fabric comprises the core-sheath spun yarn in the weft direction, and the polypropylene monofilament yarn in the warp direction;

the core-sheath spun yarn comprises the polypropylene core having a denier of about 1800 and the round cross section, and the polypropylene or polyester fiber sheath having a denier of about 700 and the round cross section;

the polypropylene monofilament yarn has a denier of about 1000 and the oval cross section;

the woven geotextile filtration fabric is configured to have an apparent opening size of about 0.300 millimeters or less and a water flow rate of at least 70 gallons per minute per square foot;

a grab tensile strength of about 415 pounds or more in the warp direction;

a grab tensile strength of about 342 pounds or more in the weft direction;

a CBR (California Bearing Ratio) puncture strength of about 1140 pounds or more;

a trapezoid tear strength of about 146 pounds or more in the warp direction; and a trapezoid tear strength of about 140 pounds or more in the weft direction.

12. A woven geotextile filtration fabric comprising weft yarns and warp yarns interwoven with the weft yarns to thereby provide the woven geotextile filtration fabric, wherein either or both of the warp yarns and weft yarns comprise core-sheath spun yarn, wherein:
  one of the weft yarns and warp yarns comprise the core-sheath spun yarn;
  the other one of the weft yarns and warp yarns comprise polypropylene monofilament yarn;
  the core-sheath spun yarn comprises a polypropylene core and a polypropylene or polyester fiber sheath;
  the polypropylene monofilament yarn has an oval cross section;
  the polypropylene core has a round cross section; and
  the polypropylene or polyester fiber sheath has a round cross section.

13. The woven geotextile filtration fabric of claim 12, wherein the woven geotextile filtration fabric has:
  a grab tensile strength of about 472 pounds or more in the warp direction; and/or
  a grab tensile strength of about 362 pounds or more in the weft direction; and/or
  a CBR (California Bearing Ratio) puncture strength of about 1382 pounds or more; and/or
  a trapezoid tear strength of about 145 pounds or more in the warp direction; and/or
  a trapezoid tear strength of about 256 pounds or more in the weft direction.

14. The woven geotextile filtration fabric of claim 12, wherein:
  the woven geotextile filtration fabric is configured to have an apparent opening size of about 0.075 millimeters or less and a water flow rate of at least 32 gallons per minute per square foot; or
  the woven geotextile filtration fabric is configured to have an apparent opening size of about 0.300 millimeters or less and a water flow rate of at least 70 gallons per minute per square foot.

15. The woven geotextile filtration fabric of claim 12, wherein the geotextile filtration fabric has:
  a grab tensile strength of about 415 pounds or more in the warp direction; and/or
  a grab tensile strength of about 342 pounds or more in the weft direction; and/or
  a CBR (California Bearing Ratio) puncture strength of about 1140 pounds or more; and/or
  a trapezoid tear strength of about 146 pounds or more in the warp direction; and/or
  a trapezoid tear strength of about 140 pounds or more in the weft direction.

16. The woven geotextile filtration fabric of claim 12, wherein:
  the weft yarns comprise the core-sheath spun yarn including the polypropylene core having a denier of about 1800 and the round cross section, and the polypropylene or polyester fiber sheath having a denier of about 1600 and the round cross section; and
  the warp yarns comprise the polypropylene monofilament yarn having a denier of about 1000 and the oval cross-section.

17. The woven geotextile filtration fabric of claim 12, wherein:
  the weft yarns comprise the core-sheath spun yarn having a total denier of about 1800, the core-sheath spun yarn including the polypropylene core having a denier of about 1100 and the round cross section, and the polypropylene or polyester fiber sheath having a denier of about 700 and the round cross section; and
  the warp yarns comprise the polypropylene monofilament yarn having a denier of about 1000 and the oval cross section.

18. The woven geotextile filtration fabric of claim 12, wherein:
  a sheath weight percentage compared to a total weight of the core-sheath spun yarn ranges from about 10% to about 99%; and/or
  the core-sheath spun yarn includes filaments having 1 denier per filament to 60 denier per filament, and the filaments are coupled together to form a single or multiple yarns for a core, which are encapsulated in a single fiber or a blend of multiple fibers around the core.

* * * * *

UNITED STATES PATENT AND TRADEMARK OFFICE
CERTIFICATE OF CORRECTION

PATENT NO.        : 10,434,445 B2
APPLICATION NO.   : 15/673552
DATED             : October 8, 2019
INVENTOR(S)       : Ray et al.

It is certified that error appears in the above-identified patent and that said Letters Patent is hereby corrected as shown below:

In the Drawings

Replace Table I, FIGS. 4-7 with the attached drawing sheets

Signed and Sealed this
Fourteenth Day of April, 2020

Andrei Iancu
*Director of the United States Patent and Trademark Office*

Table I

|  | ASTM Method | Test Unit | Exemplary Fabric A | Reported Minimum Average Roll Values | | |
|---|---|---|---|---|---|---|
|  |  |  |  | Fabric B | Fabric C | Fabric D |
| Grab Tensile Strength - Warp | ASTM D4632 | lbs | 472 | 370 | 370 | 370 |
| Grab Tensile Elongation - Warp | ASTM D4632 | % | 30 | 15 | 15 | 15 |
| Grab Tensile Strength - Weft | ASTM D4632 | lbs | 362 | 250 | 250 | 250 |
| Grab Tensile Elongation - Weft | ASTM D4632 | % | 15 | 15 | 15 | 15 |
| CBR Puncture Strength | ASTM D6241 | lbs | 1382 | 950 | 950 | 950 |
| Trapezoid Tear Strength - Warp | ASTM D4533 | lbs | 145 | 100 | 100 | 100 |
| Trapezoid Tear Strength - Weft | ASTM D4533 | lbs | 256 | 60 | 60 | 60 |
| Apparent Opening Size (AOS)* | ASTM D4751 | U.S. Sieve | 200 | 70 | 70 | 70 |
| Apparent Opening Size (AOS)* | ASTM D4751 | mm | 0.075 | 0.212 | 0.212 | 0.212 |
| Permittivity | ASTM D4491 | $sec^{-1}$ | 0.43 | 0.28 | 0.28 | 0.28 |
| Flow Rate | ASTM D4491 | $gal/min/ft^2$ | 32 | 18 | 18 | 18 |
| *Maximum Average Roll Value | | | | | | |

FIG. 4

| Table II | | | | Reported Minimum Average Roll Values | | |
|---|---|---|---|---|---|---|
| | ASTM Method | Test Unit | Exemplary Fabric A | Fabric H | Fabric I | Fabric J |
| Grab Tensile Strength - Warp | ASTM D4632 | lbs | 472 | 250 | 250 | 250 |
| Grab Tensile Elongation - Warp | ASTM D4632 | % | 30 | 50 | 50 | 50 |
| Grab Tensile Strength - Weft | ASTM D4632 | lbs | 362 | 250 | 250 | 250 |
| Grab Tensile Elongation - Weft | ASTM D4632 | % | 15 | 50 | 50 | 50 |
| CBR Puncture Strength | ASTM D6241 | lbs | 1382 | 625 | 700 | 700 |
| Trapezoid Tear Strength - Warp | ASTM D4533 | lbs | 145 | 100 | 100 | 100 |
| Trapezoid Tear Strength - Weft | ASTM D4533 | lbs | 256 | 100 | 100 | 100 |
| Apparent Opening Size (AOS)* | ASTM D4751 | U.S. Sieve | 200 | 100 | 100 | 100 |
| Apparent Opening Size (AOS)* | ASTM D4751 | mm | 0.075 | 0.150 | 0.150 | 0.150 |
| Permittivity | ASTM D4491 | $sec^{-1}$ | 0.43 | 1.2 | 0.8 | 1.2 |
| Flow Rate | ASTM D4491 | $gal/min/ft^2$ | 32 | 80 | 75 | 80 |
| *Maximum Average Roll Value | | | | | | |

FIG. 5

| Table III | | | | | |
|---|---|---|---|---|---|
| | | | | Reported Minimum Average Roll Values | |
| | ASTM Method | Test Unit | Exemplary Fabric E | Fabric F | Fabric G |
| Grab Tensile Strength - Warp | ASTM D4632 | lbs | 415 | 320 | 375 |
| Grab Tensile Elongation - Warp | ASTM D4632 | % | 28 | 15 | 15 |
| Grab Tensile Strength - Weft | ASTM D4632 | lbs | 342 | 320 | 375 |
| Grab Tensile Elongation - Weft | ASTM D4632 | % | 22 | 12 | 8 |
| CBR Puncture Strength | ASTM D6241 | lbs | 1140 | 620 | 1200 |
| Trapezoid Tear Strength - Warp | ASTM D4533 | lbs | 146 | 120 | 120 |
| Trapezoid Tear Strength - Weft | ASTM D4533 | lbs | 140 | 120 | 120 |
| Apparent Opening Size (AOS)* | ASTM D4751 | U.S. Sieve | 50 | 50 | 50 |
| Apparent Opening Size (AOS)* | ASTM D4751 | mm | 0.300 | 0.300 | 0.300 |
| Permittivity | ASTM D4491 | $sec^{-1}$ | 0.93 | 0.2 | 0.2 |
| Flow Rate | ASTM D4491 | gal/min/ft$^2$ | 70 | N/A | 15 |
| *Maximum Average Roll Value | | | | | |

FIG. 6

| Table IV | | | | | | |
|---|---|---|---|---|---|---|
| | | | | Reported Minimum Average Roll Values | | |
| | ASTM Method | Test Unit | Exemplary Fabric E | Fabric K | Fabric L | Fabric M |
| Grab Tensile Strength - Warp | ASTM D4632 | lbs | 415 | 80 | 80 | 80 |
| Grab Tensile Elongation - Warp | ASTM D4632 | % | 28 | 50 | 50 | 50 |
| Grab Tensile Strength - Weft | ASTM D4632 | lbs | 342 | 80 | 80 | 80 |
| Grab Tensile Elongation - Weft | ASTM D4632 | % | 22 | 50 | 50 | 50 |
| CBR Puncture Strength | ASTM D6241 | lbs | 1140 | 175 | 175 | 175 |
| Trapezoid Tear Strength - Warp | ASTM D4533 | lbs | 146 | 25 | 30 | 30 |
| Trapezoid Tear Strength - Weft | ASTM D4533 | lbs | 140 | 25 | 30 | 30 |
| Apparent Opening Size (AOS)* | ASTM D4751 | U.S. Sieve | 50 | 50 | 50 | 50 |
| Apparent Opening Size (AOS)* | ASTM D4751 | mm | 0.300 | 0.300 | 0.300 | 0.300 |
| Permittivity | ASTM D4491 | $sec^{-1}$ | 0.93 | 2.2 | 2.1 | 2.2 |
| Flow Rate | ASTM D4491 | gal/min/ft$^2$ | 70 | 150 | 155 | 150 |
| *Maximum Average Roll Value | | | | | | |

FIG. 7